United States Patent
Gauthier et al.

(10) Patent No.: US 6,973,398 B2
(45) Date of Patent: Dec. 6, 2005

(54) SYSTEM LEVEL REDUCTION OF CLOCK SKEW BASED ON LOCAL THERMAL PROFILING

(75) Inventors: Claude R. Gauthier, Cupertino, CA (US); Pradeep R. Trivedi, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 10/385,346

(22) Filed: Mar. 10, 2003

(65) Prior Publication Data

US 2004/0181354 A1 Sep. 16, 2004

(51) Int. Cl.[7] .............................................. G01K 15/00

(52) U.S. Cl. .................... 702/99; 702/130; 702/136

(58) Field of Search .. 702/99, 130, 136; 327/156–158, 327/161–163

(56) References Cited

U.S. PATENT DOCUMENTS

| | | | | |
|---|---|---|---|---|
| 5,233,161 A | * | 8/1993 | Farwell et al. | 219/209 |
| 5,881,271 A | * | 3/1999 | Williams | 713/401 |
| 6,346,838 B1 | * | 2/2002 | Hwang et al. | 327/156 |
| 6,686,785 B2 | * | 2/2004 | Liu et al. | 327/158 |
| 6,772,085 B2 | * | 8/2004 | Watkins et al. | 702/130 |

OTHER PUBLICATIONS

Stinson et al.; "14.4 A 1.5GHz Third Generation Itanium® Processor"; International Solid State Circuits Conference, 2003, Session 14/Microprocessor/Paper 14.4, Feb. 11, 2003; 6 pgs.

* cited by examiner

*Primary Examiner*—John Barlow
*Assistant Examiner*—Hien Vo
(74) *Attorney, Agent, or Firm*—Osha Liang LLP

(57) ABSTRACT

A method and apparatus for adjusting clock skew involves sensing a temperature at a location on an integrated circuit. A temperature sensor indicates a temperature value of the location on the integrated circuit. The temperature value is monitored, and a tunable buffer is adjusted dependent on the monitoring. The tunable buffer is used to adjust clock skew.

18 Claims, 8 Drawing Sheets

SYSTEM LEVEL REDUCTION OF CLOCK SKEW BASED ON LOCAL THERMAL PROFILING

BACKGROUND OF INVENTION

As shown in FIG. 1, a typical computer system (10) has, among other components, a microprocessor (12), one or more forms of memory (14), integrated circuits (IC) (16) having specific functionalities, and peripheral computer resources (not shown), e.g., monitor, keyboard, software programs, etc. These components communicate with one another via communication paths (19), e.g., wires, buses, etc., to accomplish the various tasks of the computer system (10).

In order to properly accomplish such tasks, the computer system (10) relies on the basis of time to coordinate its various operations. To that end, a crystal oscillator (18) generates a system clock signal (referred to and known in the art as "reference clock" and shown in FIG. 1 as SYS_CLK) to various parts of the computer system (10). Modern microprocessors and other integrated circuits, however, are typically capable of operating at frequencies significantly higher than the system clock signal, and thus, it becomes important to ensure that operations involving the microprocessor (12) and the other components of the computer system (10) use a proper and accurate reference of time.

One component used within the computer system (10) to ensure a proper reference of time among the system clock signal and a microprocessor clock signal, i.e., "chip clock signal" or CHIP_CLK, is a type of clock generator known as a phase locked loop (PLL) (20). The PLL (20) is an electronic circuit that controls an oscillator such that the oscillator maintains a constant phase relative to the system clock signal. Referring to FIG. 1, the PLL (20) has as its input the system clock signal, which is its reference signal, and outputs a chip clock signal (shown in FIG. 1 as CHIP_CLK) to the microprocessor (12). The system clock signal and chip clock signal have a specific phase and frequency relationship controlled by the PLL (20). This relationship between the phase and frequency of the system clock signal and chip clock signal ensures that the various components within the microprocessor (12) use a controlled and accounted for reference of time. When this relationship is not maintained by the PLL (20), however, the operations within the computer system (10) become non-deterministic.

FIG. 2 shows a block diagram of a typical phase locked loop and buffered clock tree (200). The phase locked loop (202) receives a clock signal from clock path (201). The phase locked loop (202) outputs a clock signal on clock path (203). The clock signal on clock path (203) may have an increased frequency compared to the frequency of the clock signal on clock path (201). The phase locked loop (202) drives the clock signal on clock path (203) so that the clock signal on clock path (203) may connect to other circuits using the buffered clock tree (200).

The buffered clock tree (200) includes many buffers (230, 232, 234, 236, 238, 240, 242, 244, 246, 248, 250) to propagate and amplify the clock signal on clock path (203). The buffers (230, 232, 234, 236, 238, 240, 242, 244, 246, 248, 250) may be distributed across a microprocessor (e.g., microprocessor (12) shown in FIG. 1). The phase locked loop (202) receives an input clock signal from part of the buffered clock tree (200) formed by the clock signal on clock path (203). Accordingly, the phase locked loop (202) may adjust the timing and frequency of the clock signal on clock path (203) to compensate for some of the effects caused by the buffers (230, 232, 234, 236, 238, 240, 242, 244, 246, 248, 250).

A delay, or clock skew, on different branches of the buffered clock tree (200) may vary. Clock skew, or more generally a signal skew, can be defined as the difference in time between an edge of a clock signal at two different locations in the integrated circuit. Furthermore, clock skew may also account for differences in edge transition rates of a signal in addition to propagation delays. The clock skew may be caused, for example, by different impedances, voltages, process variations, and temperatures. Variations in clock skew are typically accounted for in a microprocessor (e.g., microprocessor (12) shown in FIG. 1) design. As a microprocessor (e.g., microprocessor (12) shown in FIG. 1) clock frequency increases, an acceptable margin for clock skew decreases.

FIG. 3 shows an exemplary thermal profile (300) of an integrated circuit (e.g., microprocessor (12) shown in FIG. 1). The thermal profile (300) has several local hot spots (310) where more heat is generated than other locations on the integrated circuit. The hot spots (310) may have different temperatures, different sizes, different locations, and different effects on local circuits. Furthermore, the hot spots (310) may change location based on the activities of the integrated circuit. Accordingly, the clock skew of the buffers (230, 232, 234, 236, 238, 240, 242, 244, 246, 248, 250 shown in FIG. 2) in the buffered clock tree (200 shown in FIG. 2) may be affected by the temperature differences across a microprocessor (e.g., microprocessor (12) shown in FIG. 1).

SUMMARY OF INVENTION

According to one aspect of one or more embodiments of the present invention, an apparatus comprising a first temperature sensor arranged to indicate a first temperature value; a temperature processing unit operatively connected to the first temperature sensor and responsive to the first temperature value; a first bias generator arranged to generate at least one first bias signal dependent on the temperature processing unit; and a first tunable buffer arranged to adjust a first signal skew dependent on the at least one first bias signal.

According to one aspect of one or more embodiments of the present invention, a method comprising indicating a first value representative of a first temperature at a first location; monitoring the first value; communicating the first value where the communicating is responsive to the monitoring; determining a first adjustment value dependent on the first value where the determining is dependent on the communicating; and adjusting a skew of a first signal dependent on the first adjustment value.

According to one aspect of one or more embodiments of the present invention, an apparatus comprising means for indicating a value representative of a temperature at a location of the apparatus; means for monitoring the value; means for communicating the value where the means for communicating is responsive to the means for monitoring; means for determining an adjustment value dependent on the value where the means for determining is dependent on the means for communicating; and means for adjusting a skew of a first signal dependent on the adjustment value.

Other aspects and advantages of the invention will be apparent from the following description and the appended claims.

DETAILED DESCRIPTION

Embodiments of the present invention relate to a method and apparatus to adjust one or more tunable buffers to reduce clock skew. In certain embodiments, one or more temperature sensors are monitored on an integrated circuit, and one or more temperature values may be communicated to another integrated circuit. The one or more tunable buffers may be adjusted to reduce the clock skew. A bias generator may be used to adjust the tunable buffers. An adjustment value may be determined by the another integrated circuit.

Figure 1:
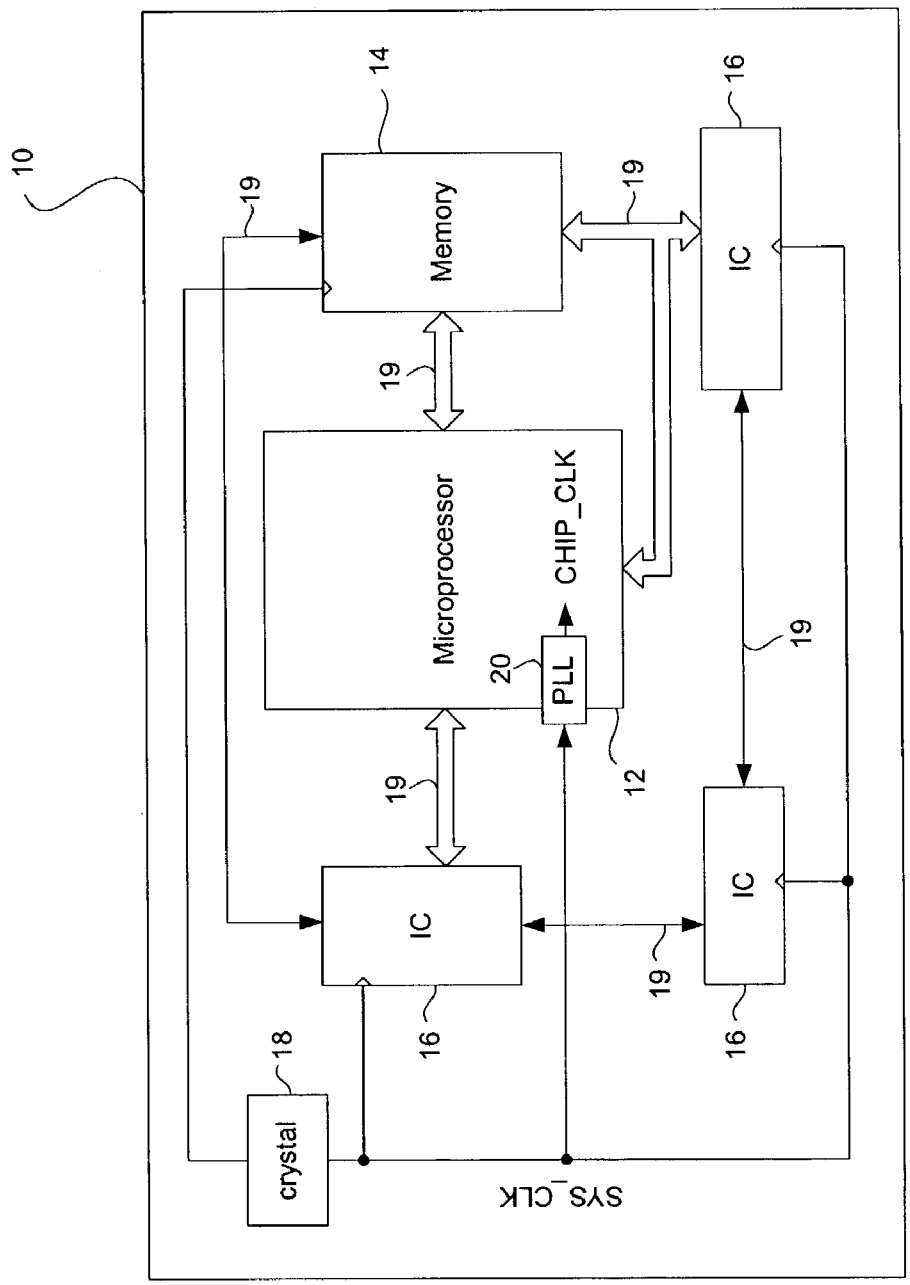
FIG. 1 shows a block diagram of a typical computer system.
Figure 2:
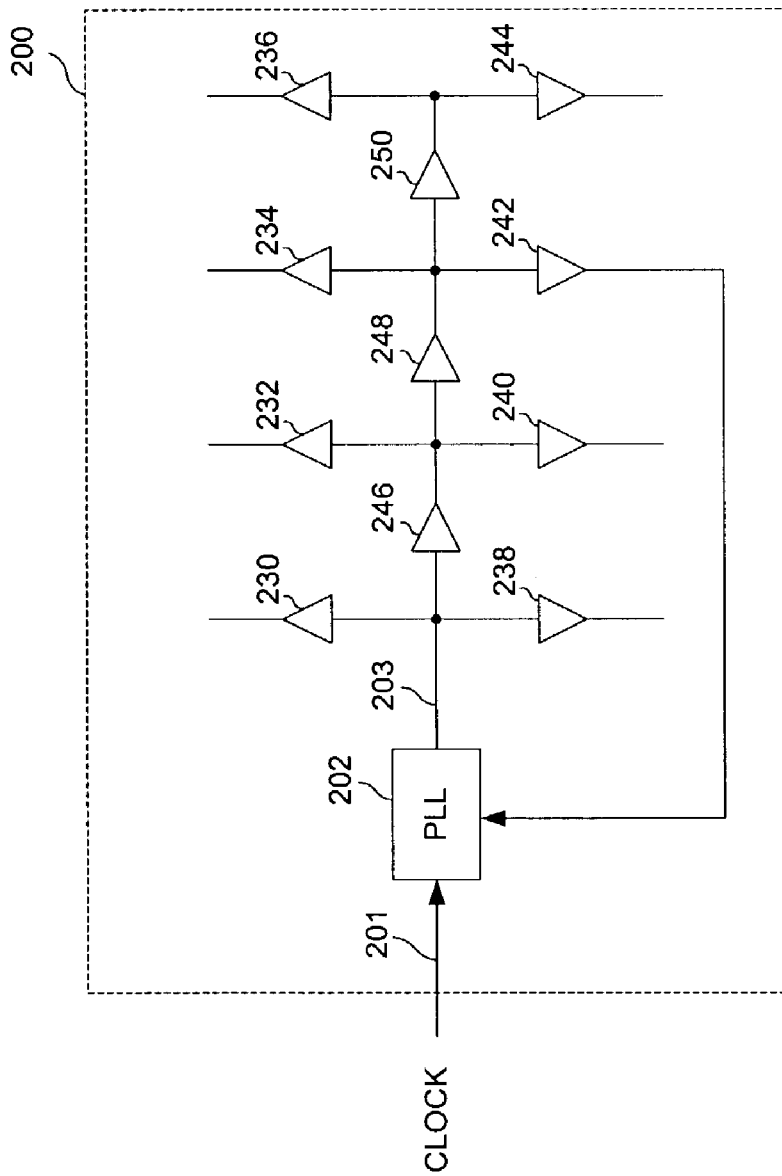
FIG. 2 shows a block diagram of a typical phase locked loop and buffered clock tree.
Figure 3:
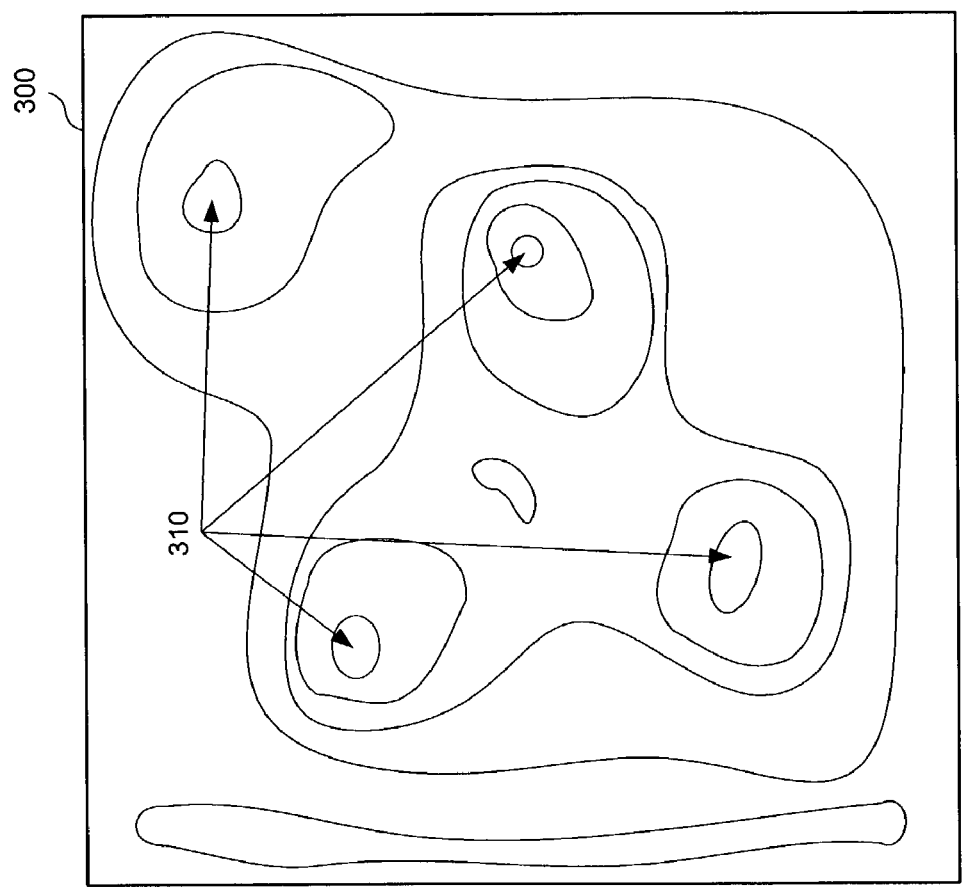
FIG. 3 shows an exemplary thermal profile of an integrated circuit.
Figure 4:
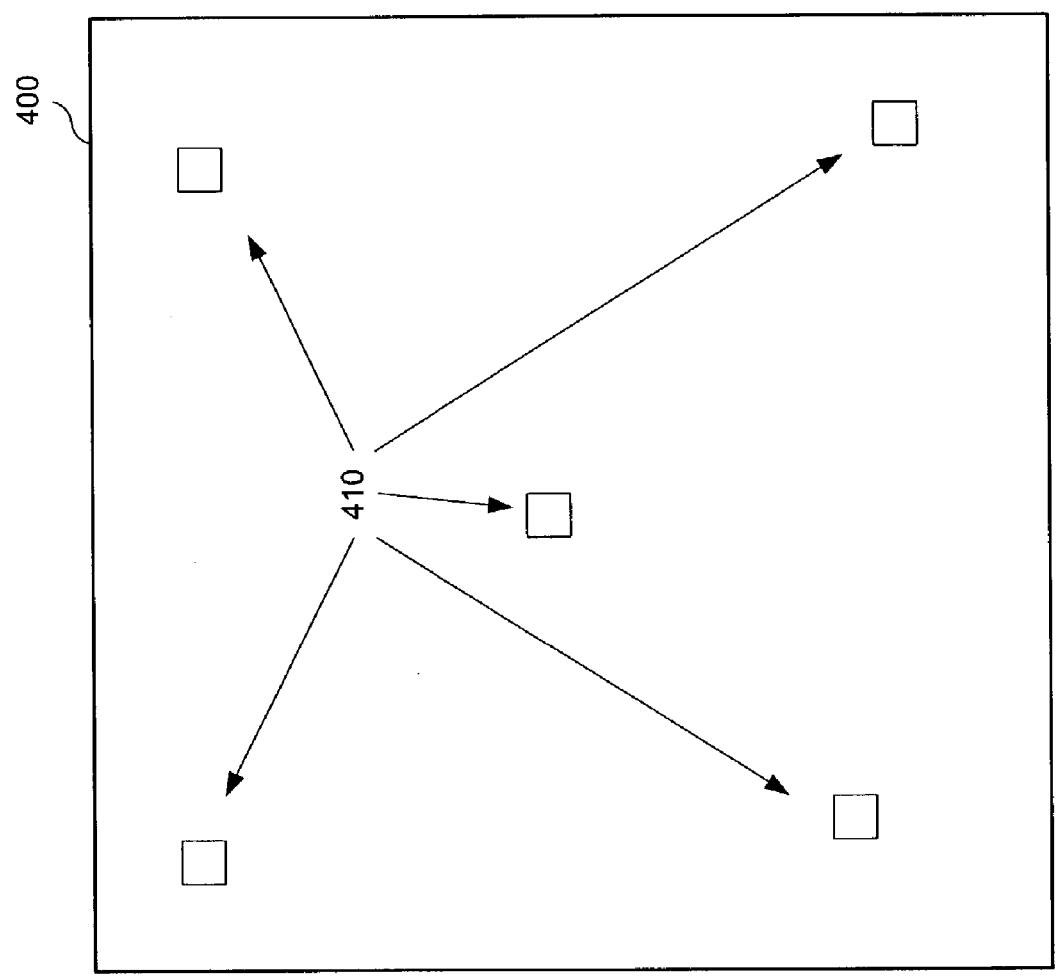
FIG. 4 shows a block diagram of an integrated circuit with a plurality of temperature sensors in accordance with an embodiment of the present invention.

FIG. 4 shows a block diagram of an exemplary integrated circuit (400) with a plurality of temperature sensors (410) in accordance with an embodiment of the present invention. The temperature sensors (410) may be distributed across the integrated circuit (400). Accordingly, the temperature sensors (410) may indicate a temperature value representative of a temperature local to the temperature sensors (410).

One of ordinary skill in the art will understand that one, or more than one, temperature sensor may be used on the integrated circuit (400). Also, the temperature sensors (410) may be arranged in a desired pattern, such as on regions where a temperature may increase more than other regions and/or regions where a temperature shift may have a greater effect. Furthermore, the temperature sensors (410) may be arranged in a grid pattern.

Figure 5:
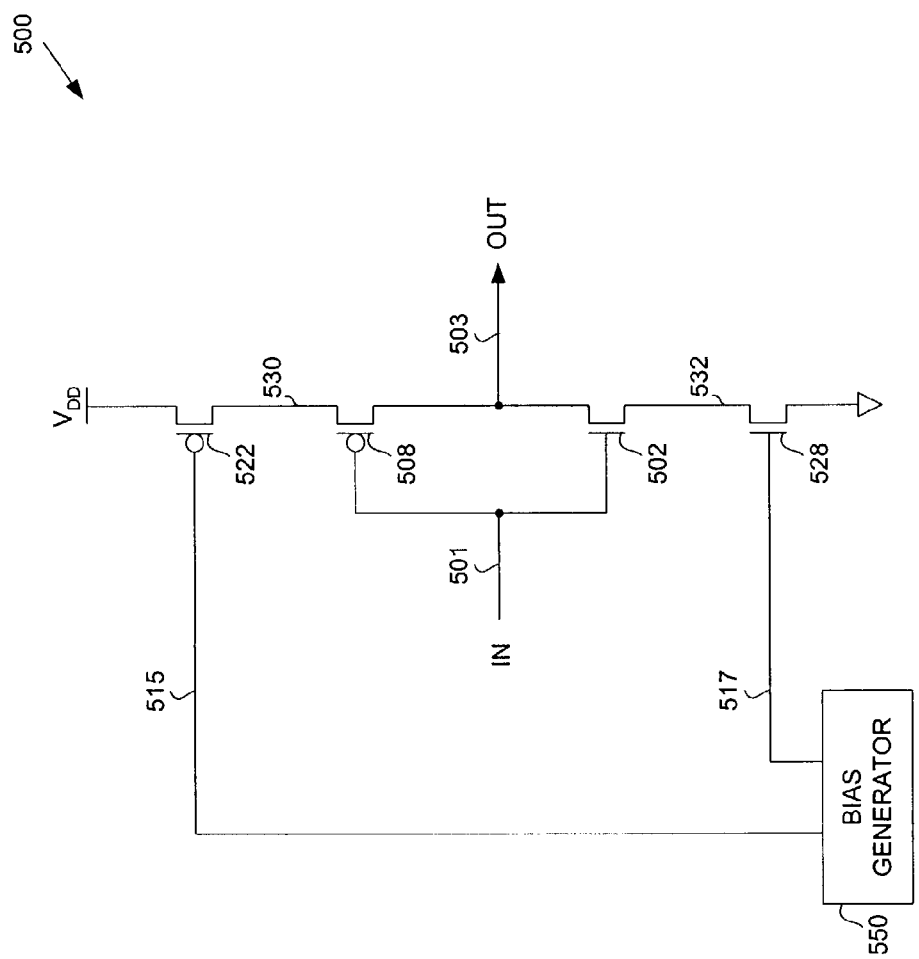
FIG. 5 shows a schematic diagram of a tunable buffer system in accordance with an embodiment of the present invention.

FIG. 5 shows a schematic diagram of an exemplary tunable buffer system (500) in accordance with an embodiment of the present invention. The tunable buffer includes transistors (522, 508, 502, 528). A bias voltage on paths (515, 517) control a current through the tunable buffer. Accordingly, the current from a power supply $V_{DD}$ available on path (530) and the current from a power supply $V_{SS}$ on path (532) may be controlled. The transistors (508, 502) form an inverter structure. In other words, if an input signal (501) has a high voltage potential, transistor (502) is "on," and transistor (508) is "off." Accordingly, an output signal (503) has a low voltage potential. Conversely, if the input signal (501) has a low voltage potential, transistor (502) is "off," and transistor (508) is "on." Accordingly, the output signal (503) has a high voltage potential.

The transistors (522, 528) control a rate of transition between the low voltage potential and high voltage potential, and vice versa. Accordingly, if the input signal (501) is a clock signal, a delay of the clock signal may be controlled. Such control of the clock signal may facilitate the reduction of clock skew with respect to the receipt of the clock signal at other locations.

A bias generator (550) controls the bias voltage on paths (515, 517). A change in the bias voltage on either path (515, 517) may change the clock skew through the tunable buffer.

Figure 6:
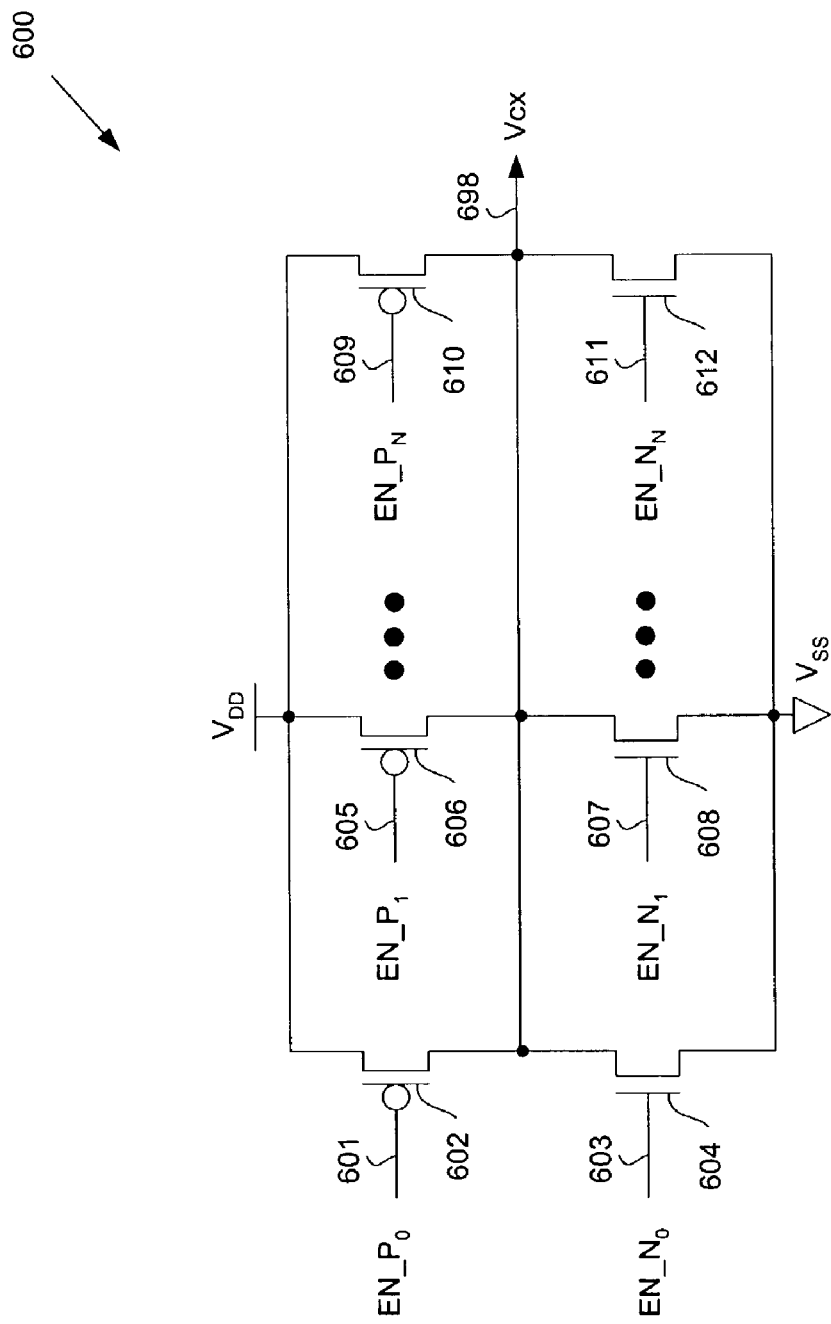
FIG. 6 shows a block diagram of a bias generator in accordance with an embodiment of the present invention.

FIG. 6 shows a schematic diagram of an exemplary bias generator (600) in accordance with an embodiment of the present invention. In FIG. 6, the bias generator (600) includes p-channel transistors (602, 606, and 610) arranged in parallel with each other. The p-channel transistors (602, 606, and 610) connect between a power supply, Vdd, and a common node, Vcx (698). The common node Vcx (698) provides a biasing signal, e.g., biasing signal (515) shown in FIG. 5. The bias generator (600) also includes n-channel transistors (604, 608, and 612) arranged in parallel with each other. The n-channel transistors (604, 608, and 612) connect between ground, $V_{SS}$, and the common node, Vcx (698). The p-channel transistors (602, 606, and 610) are controlled by control signals $EN\_P_0$ (601), $EN\_P_1$ (605), and $EN\_P_N$ (609), respectively. The n-channel transistors (604), (608), and (612) are controlled by control signals $EN\_N_0$ (603), $EN\_N_1$ (607), and $EN\_N_N$ (611), respectively. A low voltage on any of the EN_P signals (601, 605, and 609) will turn "on" their respective p-channel transistors (602, 606, and 610). A high voltage on any of the EN_N signals (603, 607, and 611) will turn "on" their respective n-channel transistors (604, 608, and 612).

Any p-channel transistor (602, 606, and 610) that is "on" will have a tendency to increase the voltage on Vcx (698) toward Vdd. Any n-channel transistor (604, 608, and 612) that is "on" will have a tendency to lower the voltage on Vcx (698) toward Vss. By selecting which p-channel transistors (602, 606, and 610) and/or n-channel transistors (604, 608, and 612) are "on", a change in the voltage on Vcx (698) may be achieved.

One of ordinary skill in the art, having benefit of the present invention, will understand that the p-channel transistors (602, 606, and 610) and n-channel transistors (604, 608, and 612) may be turned "on" individually or as a group. The p-channel transistors (602, 606, and 610) and n-channel transistors (604, 608, and 612) may be sized so that each transistor has a different effect as compared to the other transistors, e.g., a transistor's gate width may be varied to adjust the strength of the transistor. The gate widths may be designed to provide a linear, exponential, or other function as more transistors are turned "on." The p-channel transistors (602, 606, and 610) and n-channel transistors (604, 608, and 612) may be sized so that each transistor has an inherently resistive nature, e.g., a transistor's gate length may be increased (long-channel transistors) to increase the inherent resistance of the transistor. A larger inherent resistance may be advantageous if both a p-channel transistor and a n-channel transistor are "on" simultaneously. In other embodiments, the bias generator (600) may include only one p-channel transistor and one n-channel transistor connected in series.

Those skilled in the art will appreciate that by selectively controlling the bias generator, the bias generator may be used to adjust a particular bias signal, e.g., bias signal (515 and 517) shown in FIG. 5, within a tunable buffer, thereby adjusting current and resistive properties of particular circuitry within the tunable buffer in order to attain a desired propagation delay of a signal responsive to the particular circuitry.

Figure 7:
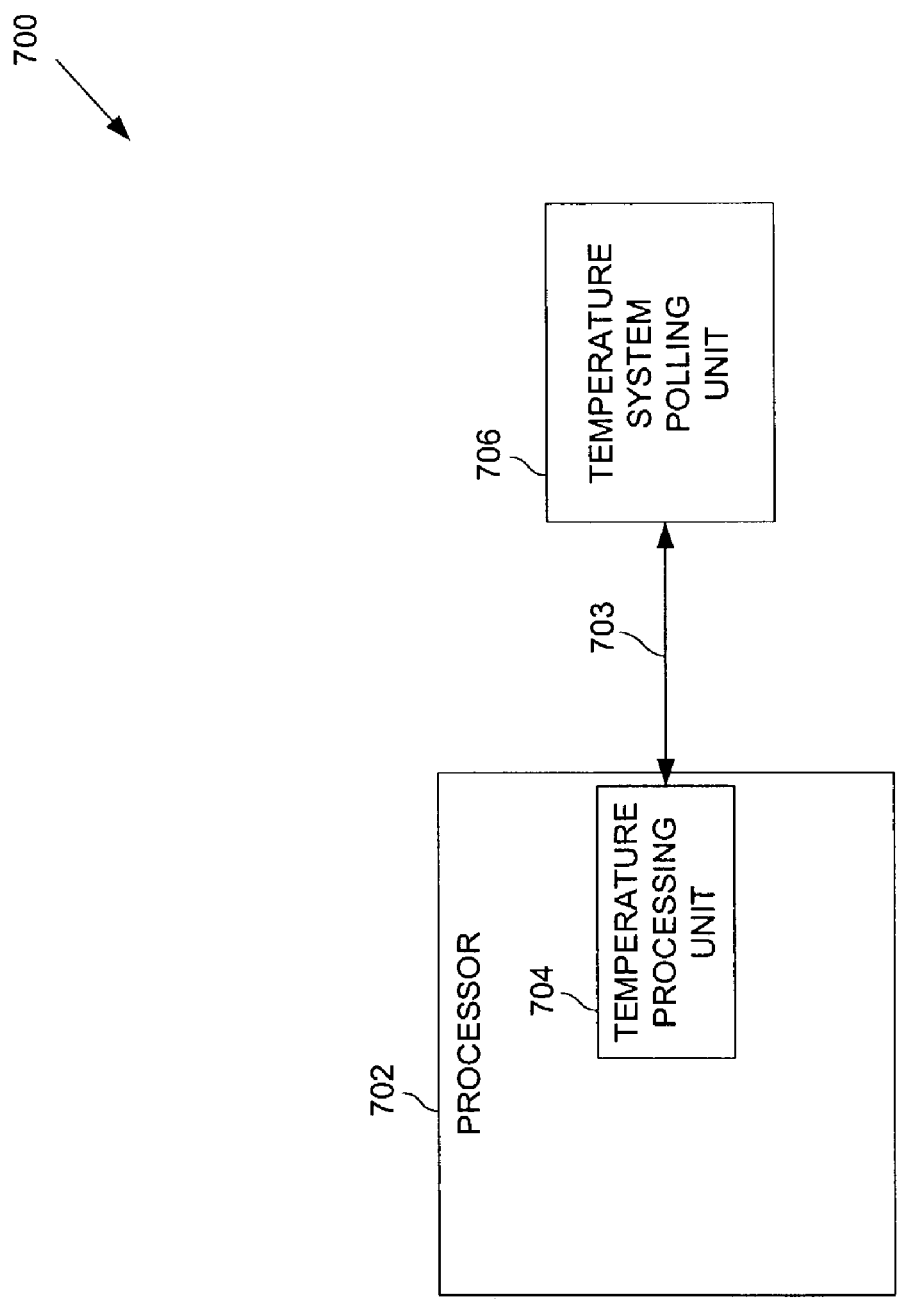
FIG. 7 shows a block diagram of a processor clock skew adjustment arrangement in accordance with an embodiment of the present invention.

FIG. 7 shows a block diagram of an exemplary processor clock skew adjustment arrangement (700) in accordance with an embodiment of the present invention. The processor clock skew adjustment arrangement (700) includes a processor (702) operatively connected to a temperature system polling unit (706) using, at least, path (703). A temperature processing unit (704) is used to monitor temperature values indicated by temperature sensors on the processor (702). The temperature processing unit (704) communicates with the temperature system polling unit (706) such that the temperature system polling unit (706) receives the temperature values monitored by the temperature processing unit (704).

The processor (702) includes at least one tunable buffer (not shown) that may be adjusted by a bias generator (not shown). In one embodiment, the temperature system polling unit (706) determines an adjustment value used to adjust the tunable buffer using the bias generator. Accordingly, the temperature system polling unit (706) may communicate with the temperature processing unit (704). In turn, the temperature processing unit (704) may adjust the bias generator. An adjustment to the bias generator may adjust a clock skew of a clock signal that flows through the tunable buffer.

One of ordinary skill in the art will understand that a temperature processing unit may be included in an integrated circuit that is used to form a processor. A temperature system polling unit may also be included in the integrated circuit that is used to form the processor. Conversely, the temperature system polling unit may be included in a separate integrated circuit from the integrated circuit that is used to form the processor. Furthermore, the temperature system polling unit may receive the temperature values monitored by the temperature processing unit; however, the temperature system polling unit may adjust a bias generator without use of the temperature processing unit.

Figure 8:
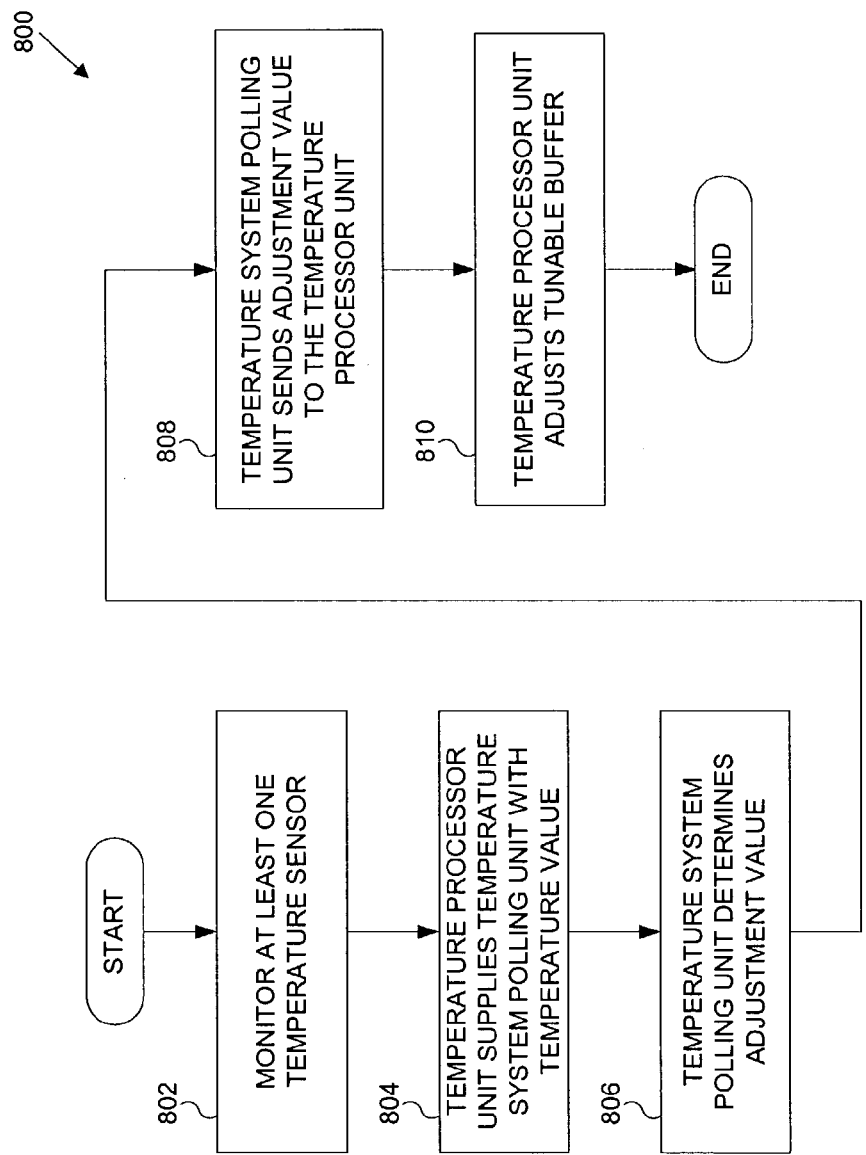
FIG. 8 shows a flow diagram of a clock skew adjustment system in accordance with an embodiment of the present invention.

FIG. 8 shows an exemplary flow diagram (800) of a clock skew adjustment system in accordance with an embodiment of the present invention. A processor (e.g., processor (702) in FIG. 7) is operated and a temperature at a location on the processor (e.g., processor (702) in FIG. 7) is monitored (step 802). For example, a temperature processing unit (e.g., temperature processing unit (704) shown in FIG. 7) monitors a temperature value indicated by at least one temperature sensor. The temperature processing unit (e.g., temperature processing unit (704) shown in FIG. 7) communicates with a temperature system polling unit (e.g., temperature system polling unit (706) shown in FIG. 7). A temperature value may be communicated to the temperature system polling unit by the temperature processing unit (step 804).

The temperature system polling unit may determine an adjustment value (step 806). The adjustment value is communicated to the temperature processing unit (step 808). Accordingly, the temperature processing unit adjusts a bias generator, which may adjust a tunable buffer (step 810). Adjusting a tunable buffer may adjust a clock skew for a clock signal propagated by a clock tree.

In one embodiment of the present invention, a temperature processing unit and a temperature system polling unit reside on the same integrated circuit. Conversely, the temperature processing unit and the temperature system polling unit may reside on different integrated circuits. Furthermore, the temperature system polling unit determines an adjustment value (step 806). The adjustment value is communicated to the processor (e.g., processor (702) in FIG. 7). The processor may adjust a bias generator, which may adjust a tunable buffer (step 810). The adjusting may not require the temperature processing unit (e.g., temperature processing unit (704) shown in FIG. 7) to adjust a bias generator.

Because the location of the temperature sensor and a location of a tunable buffer on the processor is known, an effect of the temperature on the tunable buffer may be determined. Accordingly, the tunable buffer is adjusted to offset the effect of the temperature on clock skew dependent on the monitoring.

One of ordinary skill in the art, having benefit of this disclosure, will understand that one or more of temperature sensors and one or more tunable buffers may be included in the processor. Also, obtaining a temperature value from the one or more temperature sensors may be accomplished through a wide variety of means.

Advantages of the present invention may include one or more of the following. In one or more embodiments, a temperature sensor indicates a temperature value that may be used to adjust a tunable buffer. Accordingly, an effect of a temperature value on a region of the processor can be known. Furthermore, the effect on clock skew may be offset using a tunable buffer.

In one or more embodiments, because a tunable buffer is adjusted to reduce clock skew, a margin needed to account for clock skew may be reduced.

In one or more embodiments, because an adjustment for clock skew through a tunable buffer is adjusted by a temperature system polling unit, adjustments may advantageously applied during an operation of a processor.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus, comprising:
a first temperature sensor arranged to indicate a first temperature value of a region of an integrated circuit;
a temperature processing unit operatively connected to the first temperature sensor and responsive to the first temperature value;
a first bias generator arranged to generate at least one first bias signal dependent on the temperature processing unit; and
a first tunable buffer arranged to adjust a first signal skew in the integrated circuit dependent on the at least one first bias signal.

2. The apparatus of claim 1, wherein the first signal skew comprises a clock skew.

3. The apparatus of claim 1, further comprising:
a temperature system polling unit operatively connected to the temperature processing unit.

4. The apparatus of claim 3, wherein the temperature processing unit is disposed on a first integrated circuit, and wherein the temperature system polling unit is disposed on a second integrated circuit.

5. The apparatus of claim 3, wherein the temperature system polling unit is arranged to determine an operating condition of the first tunable buffer.

6. The apparatus of claim 1, wherein the first tunable buffer is arranged within a clock tree.

7. The apparatus of claim 1, further comprising:
a second temperature sensor arranged to indicate a second temperature value;

a second bias generator arranged to generate at least one second bias signal dependent on the temperature processing unit; and a second tunable buffer arranged to adjust a second signal skew dependent on the at least one second bias signal.

8. The apparatus of claim 7, wherein the temperature processing unit is arranged to monitor the first temperature sensor and the second temperature sensor.

9. The apparatus of claim 7, further comprising:

a temperature system polling unit operatively connected to the temperature processing unit, wherein the temperature system polling unit is arranged to determine a first adjustment value with which to adjust the first tunable buffer and a second adjustment value with which to adjust the second tunable buffer.

10. The apparatus of claim 9, wherein the temperature system polling unit is arranged to maintain information about a location of the first temperature sensor, a location of the second temperature sensor, a location of the first tunable buffer, and a location of the second tunable buffer.

11. The apparatus of claim 7, wherein the second tunable buffer is arranged within a clock tree.

12. A method, comprising:

indicating a first value representative of a first temperature at a first location, wherein the indicating comprises sensing the first temperature;

monitoring the first value;

communicating the first value, wherein the communicating is responsive to the monitoring;

determining a first adjustment value dependent on the first value; wherein the determining is dependent on the communicating; and adjusting a skew of a first signal dependent on the first adjustment value.

13. The method of claim 12, further comprising:

generating a bias signal dependent on the monitoring, wherein the adjusting is dependent on the bias signal.

14. The method of claim 12, further comprising:

indicating a second value representative of a second temperature at a second location;

monitoring the second value;

communicating the second value, wherein the communicating is responsive to the monitoring;

determining a second adjustment value dependent on the second value; wherein the determining is dependent on the communicating; and adjusting a skew of a second signal dependent on the second adjustment value.

15. The method of claim 14, further comprising:

generating a bias signal dependent on the monitoring, wherein the adjusting is dependent on the bias signal.

16. The method of claim 14, wherein the indicating comprises sensing the second temperature.

17. An apparatus, comprising:

means for indicating a value representative of a temperature at a location of the apparatus, wherein the means for indicating comprises means for sensing the temperature;

means for monitoring the value;

means for communicating the value, wherein the means for communicating is responsive to the means for monitoring;

means for determining an adjustment value dependent on the value, wherein the means for determining is dependent on the means for communicating; and means for adjusting a skew of a first signal in the apparatus dependent on the adjustment value.

18. The apparatus of claim 17, wherein the means for adjusting is dependent on a bias signal.

* * * * *